J. C. GLENZER.
COUNTERBORE.
APPLICATION FILED MAY 16, 1918.
1,407,328.
Patented Feb. 21, 1922.
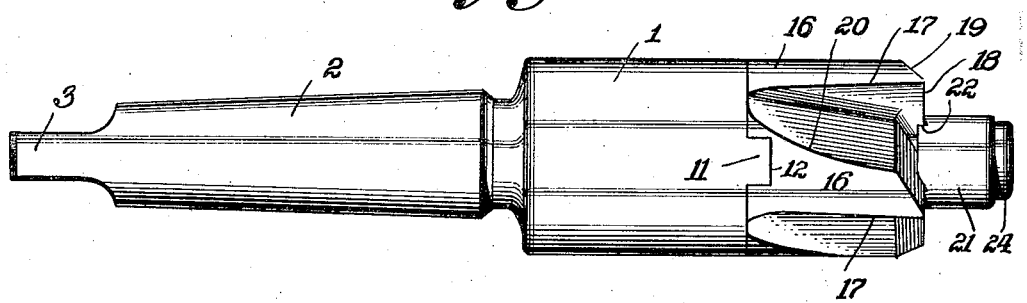
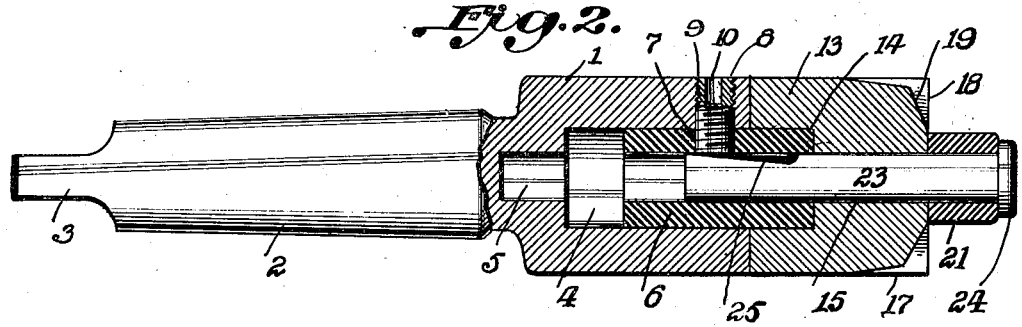
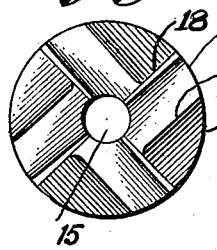
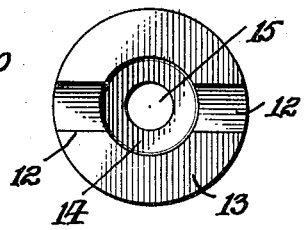
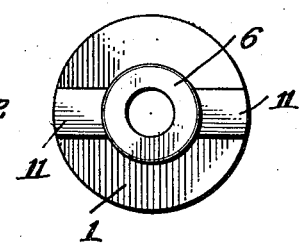
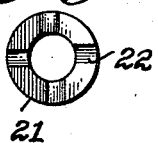
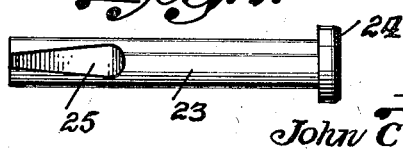
Inventor;
John C. Glenzer

UNITED STATES PATENT OFFICE.

JOHN C. GLENZER, OF DETROIT, MICHIGAN.

COUNTERBORE.

1,407,328.   Specification of Letters Patent.   Patented Feb. 21, 1922.

Application filed May 16, 1918. Serial No. 234,858.

*To all whom it may concern:*

Be it known that I, JOHN C. GLENZER, a citizen of the United States of America, residing at Detroit, in the county of Wayne and State of Michigan, have invented certain new and useful Improvements in Counterbores, of which the following is a specification, reference being had therein to the accompanying drawings.

This invention relates to a counterbore, and has special reference to certain structural improvements by which the counterbore is rendered more efficient, especially from a manufacturing stand point.

One of the objects of my invention is to furnish a cutter with a detachable center pin bushing which can be easily and quickly removed should a center pin become broken therein or stuck thereby obviating the necessity of discarding a cutter body or re-boring the same, should the center pin be broken therein.

Another object of my invention is to provide a cutter with interexchangeable cutter heads or bits that will permit of a single cutter body being used in connection with cutters of various sizes and shapes. Simple and effective means is employed for establishing a driving relation between the cutter body and its head or bit without subjecting the center pin or the pilot of the tool to excessive strains or stresses, thereby obtaining a driving relation between separatable parts as though the parts were integral.

A further object of my invention is to provide an interexchangeable counter-boring tool wherein the cutting element has teeth or cutting edges of novel contour or design permitting of the teeth or cutting edges being reshaped, ground down or sharpened before the detachable cutting element is rendered useless.

The above and other objects are attained by a tool wherein the parts are constructed with the view of reducing the cost of manufacture, and at the same time retain necessary features by which safety, durability and ease of assembling are secured. With such ends in view, my invention resides in the novel construction to be herein after considered and then followed.

Reference will now be had to the drawings,
Fig. 1 is a side elevation of the tool.
Fig. 2 is a longitudinal section of the tool, partly in elevation,
Fig. 3 is a view of the outer end of the cutter head or bit,
Fig. 4 is a view of the inner end thereof
Fig. 5 is a view of the outer end of the cutter body with the removable bushing in place.
Fig. 6 is a view of the inner end of a pilot, and
Fig. 7 is a side elevation of a center pin.

In the drawings, the reference numeral 1 denotes a tool body having a shank or spindle 2 at the inner end thereof terminating in a tang 3. The tool body 1 has a cylindrical bore 4 with the outer end thereof open and the inner end thereof communicating with a pin socket 5. The bore 4 is adapted to receive a bushing 6, which has a radially disposed opening 7 intermediate its ends to receive a screw 8 adjustable in an opening 9 in the tool body 1, said screw having a socket 10 to receive a wrench or suitable instrument adapted for rotating the screw. The screw defines the position of the bushing 6 relative to the tool body which is with the end of a bushing protruding from the open end of a socket 4, thereby removing the screw from the bushing without necessarily removing it from the tool body. The bushing may be removed should the same be rendered useless.

The outer end of the tool body 1 is provided with diametrically opposed tongues 11 adapted to fit in grooves 12 provided therefore in the inner end of a cutter head, counter bore or bit 13. The inner end of the cutter head also has an annular recess 14 to receive the outer end of the bushing 6, thus permitting of the cutter head being inter-locked with the tool body for rotative continuity.

The cutter head has a central longitudinal opening 15 and the periphery and outer end thereof are cut away to provide cutter teeth for cutting edges. Considering the same as teeth, each tooth 16 has approximately a straight longitudinal trimming edge 17, a radially disposed end cutting edge 18, an end beveled face 19 and a slightly curved clearance edge 20, the latter cooperating with the trimming edge in providing a flute or groove which affords clearance for chips, shavings or matter removed by the cutter head. The shape of each tooth provides a wide base for the same and permits of the tooth being repeatedly sharpened, ground or re-shaped so that it may be extensively used before the cutter head is discarded as useless.

Engaging the outer end of the cutter head is a tubular pilot 21 having the inner end thereof notched or shaped, as at 22 to fit the outer ends of the teeth 16, and said pilot is held by a center pin 23 having a head 24 at the outer end thereof. The center pin 23 extends through the opening 15 of the cutter head in to the bushing 6 and has a beveled face 25 engaged by the inner end of a screw 8 by which the cutter pin is maintained in the bushing; the bevel or inclination of the face 25 being such that when the screw 8 is tightened it draws the center pin 23 inwardly, forces the pilot 21 against the outer end of the cutter head and establishes a positive driving relation between the cutter head and tool body.

It is now apparent that various sizes and shapes of cutter heads may be installed by simply removing the center pin and pilot and should the center pin be broken, it does not mean throwing away the tool body or reboring the same, as the bushing with its broken pilot pin can be removed and a new bushing substituted therefor. It is also possible to use bushings of various lengths and thus accommodate different types of cutter heads while the center pin will serve in connection with any cutter head.

One embodiment of my invention has been illustrated but it is to be understood that the structural elements are susceptible to such variation and modifications as fall with the scope of the appended claim.

What I claim is:—

In a counterbore that has a body, a cutter having its inner end interlocked with the outer end of said body for rotation therewith, and a slidable headed center pin extending through said cutter into said body and held therein so as to maintain said body and cutter assembled:—a sleeve pilot loose on said pin against the head thereof and spaced from said body by the length of said cutter, said cutter having teeth throughout the length thereof and teeth on its outer end, and said pilot having its inner end notched to engage the end teeth of said cutter and brace said teeth relative to one another.

In testimony whereof I affix my signature in the presence of two witnesses.

JOHN C. GLENZER.

Witnesses:
ANNA M. DORR,
KARL H. BUTLER.